(12) United States Patent
Jerdonek

(10) Patent No.: US 7,418,728 B2
(45) Date of Patent: Aug. 26, 2008

(54) AUDITING SECRET KEY CRYPTOGRAPHIC OPERATIONS

(75) Inventor: Robert Jerdonek, Sunnyvale, CA (US)

(73) Assignee: Arcot Systems, Inc., Sunnyvale, CA (US)

( * ) Notice: Subject to any disclaimer, the term of this patent is extended or adjusted under 35 U.S.C. 154(b) by 853 days.

(21) Appl. No.: 10/803,457

(22) Filed: Mar. 17, 2004

(65) Prior Publication Data

US 2005/0210286 A1  Sep. 22, 2005

(51) Int. Cl.
*G06F 7/04* (2006.01)

(52) U.S. Cl. .............................. 726/5; 713/168; 713/171

(58) Field of Classification Search ........................ None
See application file for complete search history.

(56) References Cited

U.S. PATENT DOCUMENTS 6,105,012 A   8/2000   Chang et al.

OTHER PUBLICATIONS

Feghhi et al. (Jalal Feghhi, Jalil Feghhi, Peter Williams, Digital Certificates Applied Internet Security, 1999, ISBN: 0201309807), p. 74-76, 331-333 and 326-327.*
Sarbari Gupta, "Security Characteristics of Cryptographic Mobility Solutions", 1st Annual PKI Research Workshop—Proceedings, Jul. 2.*
Sampo Sovio, N. Asokan, Kaisa Nyberg, "Defining Authorization Domains Using Virtual Devices", Nokia Research Center, Helsinki Finland, Jan. 2003.*
Smith (Randy Franklin Smith, "Tracking Logon and Logoff Activity in windows 2000", Feb. 2001).*
Gupta, Sarbari, "*Security Characteristics of Cryptographic Mobility Solutions,*" 1st Annual PKI Research Workshop—Proceedings, http://www.google.com/search?hl=&cat=&meta=&q=pki+arcot+Dartmouth, Dec. 3, 2002, 11 pages.
Menezes, Alfred J. et al; "*Handbook of Applied Cryptography*"; 2001, Chapter 13, pp. 549-590.
SSi Service Strategies; "*SSi Audit Central Features: Consolidate System Audit Data from a Variety of Source*"; http://www.ssimail.com/Audit_central_features.htm; 12 pages.

* cited by examiner

*Primary Examiner*—Kambiz Zand
*Assistant Examiner*—Peter Poltorak
(74) *Attorney, Agent, or Firm*—Townsend and Townsend and Crew LLP

(57) ABSTRACT

In a cryptographic system, the unlocking of secret keys on a user system is audited and correlated with other events that typically occur after the secret key is used to perform a cryptographic operation. Audit evidence of secret key cryptographic operations is recorded for later review and/or analysis, for use as stored evidence of unauthorized activity and/or for use in refuting false claims of repudiation of authorized activity. Some systems might also provide users with user activity reports that can alert a user to suspicious or unauthorized activity using that user's access.

11 Claims, 3 Drawing Sheets

AUDITING SECRET KEY CRYPTOGRAPHIC OPERATIONS

FIELD OF THE INVENTION

The present invention relates generally to cryptographic systems and more particularly where keys are distributed to users for access to applications and/or data.

BACKGROUND OF THE INVENTION

It is well know to control access to data, applications, etc., through the use of keys. As used herein, the term "resource" refers to anything that a computer system might control, such as data, an application, a message, a communication channel, equipment, etc. Controlling access might involve controlling, in whole or part, a user's ability to read, write, modify, control, alter, etc., the resource having a controlled access. Control might have multiple attributes, such that a given user might be granted a particular access to a resource under some conditions, but not others. For example, a user A might be allowed to modify a message if the user has certain attributes at some time of day, but not others. As another example, user B might be allowed access to a communication channel to effect a financial transaction, if time-of-day limitations are met, type of transaction limits are met and the transaction amount is within another limitation, but other, looser limitations would apply if the user provided additional authenticating data. It should be understood that a "user" in such systems could be a human user, a user computing device or system, or human operating a computer or device for such purposes.

In a well-designed access control system, a user cannot access a protected feature with less than some amount of effort, computing power and/or time. Thus, although a user with unlimited time and computing power might be able to bypass an access control system, that does not make the system not well-designed. Many access control systems use a cryptographic system to control access, wherein a user presenting a valid key to a resource, or to a server serving the resource, is provided access to the resource on the assumption that only authorized users could present valid keys.

Some cryptographic techniques use secret keys, where each valid key provides some access to users and systems generally keep them secret, and others use public/private key pairs, wherein free access to the public key of the pair is assumed and is used for creating data, messages, etc. usable only by those having access to the private key of the pair.

Both key techniques depend on secure protection of the secret key (or the private key of a public-private key pair), so that unauthorized users do not get access to resources when access is to be prevented for those users. Secure protection of secrets is also desirable when non-repudiation is a factor. Non-repudiation is a desirable feature of an access control system that goes beyond just access control in that instead of preventing a particular user from access to a resource, it allows a system operator to prove that a particular authorized user used a resource and did so in a particular manner. For example, where secret keys are used to control a financial transaction system and an authorized user can effect a transfer of funds to an account controlled by that authorized user if the authorized user presents a secret key indicating such authorization, a non-repudiation feature allows a system operator to later prove that the authorized user was in fact the user that made the transaction.

In addition to maintaining evidence to achieve defensible proof that the user performed a particular cryptographic operation, it is also desirable to maintain records of cryptographic activity in order to detect any suspicious or malicious activity. For example, it is desirable to maintain evidence that can be used to detect that an unauthorized user is performing cryptographic operations using an authorized user's secret key.

It is known to use cryptographic operations to audit cryptographic events after they take place. For example, many vendors offer systems implementing the Identrus™ Trust Network which is designed by Identrus, which is a consortium of financial institutions that creates business and operating rules in the area of digital identities. Examples of vendor implementations that implement auditing of cryptographic events within the Identrus requirements include Kyberpass' Kyberpass TrustPlatform (Kyberpass Identrus DSMS), Thales e-Security Assure Transaction, and SECUDE Digital Signature Management System (DSMS).

The above systems audit events that occur after a secret key is used, such as signature verifications and OCSP certificate validations. OCSP (Online Certificate Status Protocol) is described in Internet RFC 2560. While those auditing techniques are useful, they might miss security breaches, fail to detect breaches early enough for remedial action to take place and might not be suitable for limiting repudiation by authorized users.

It would be desirable to overcome the shortcomings of the prior art described above.

BRIEF SUMMARY OF THE INVENTION

In one embodiment of a cryptographic system according to the present invention, the unlocking of secret keys on a user system is audited and correlated with other events that typically occur after the secret key is used to perform a cryptographic operation. In specific systems, audit evidence of secret key cryptographic operations is recorded for later review and/or analysis, for use as stored evidence of unauthorized activity and/or for use in refuting false claims of repudiation of authorized activity. Some systems might also provide users with user activity reports that can alert a user to suspicious or unauthorized activity using that user's access. Because the secret keys are locked at the user system, use of the secret keys can be audited, as uses of the secret keys involve requests to a key server for a protection key needed to unlock the secret key.

In a specific embodiment, the secret keys are used to digitally sign documents using secret keys stored in a locked form that is unlockable using a software key management system. Thus, auditing can be done on opening the locked key storage at the user system, when something is signed and/or when single use keys are obtained.

A further understanding of the nature and the advantages of the inventions disclosed herein may be realized by reference to the remaining portions of the specification and the attached drawings.

DETAILED DESCRIPTION OF THE INVENTION

Figure 1:
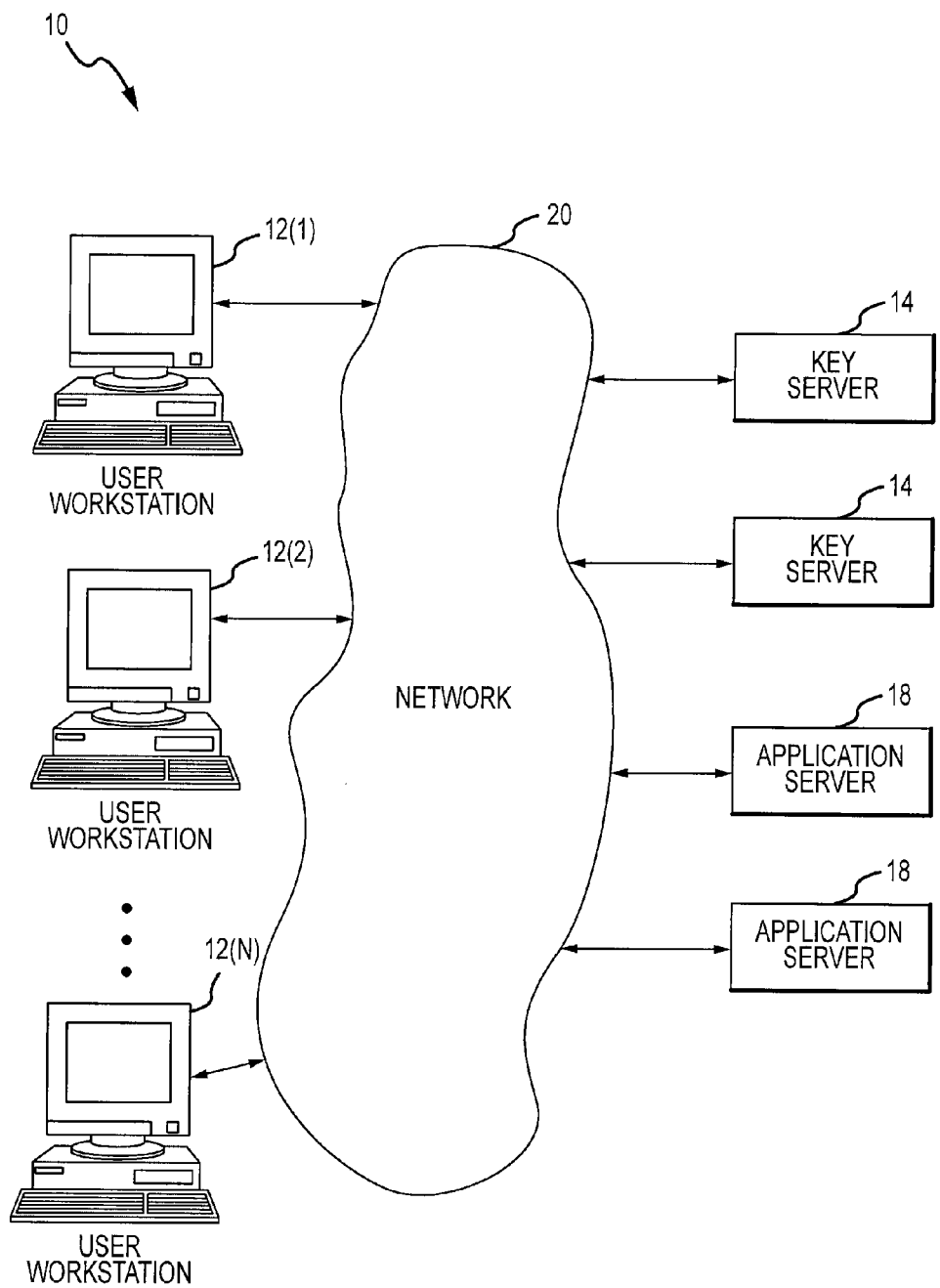
FIG. 1 is a block diagram of an overall system wherein access might be controlled.

FIG. 1 illustrates a system 10 wherein access might be controlled. In this example, user workstations 12 obtain secret keys from key servers 14 and use those keys to access application servers 18. Although the only controlled resources explicitly shown in FIG. 1 are application servers, it should be understood that this description could be generalized to any other controlled resource and in some cases, an application server 18 performs the access control for that resource. For example, an application server 18 might provide access control for an application that a user workstation is to execute, but an equivalent server might provide access control for data that the user workstation is to obtain, or access control to a messaging and/or communication system that the user workstation is to access. Examples of applications include computer interfaces, web interfaces, database applications, financial systems and their equivalents, as well as other, unmentioned applications capable of being served from an application server.

In a typical operation, a user workstation 12 contacts an application server 18 for an application over a network 20 and determines that a secret key is required for access. The user workstation 12 might already know that a secret key is required, but either way, the user workstation 12 determines if it already has the necessary key and if not, requests the key from a key server 14 over network 20 (although network 20 might be substituted for by another type of channel or two distinct networks). The particular key server 14 accessed might depend on the particular key needed. In some cases, to control access over time, secret keys are not valid forever after they are issued, so the user workstation might have a key for a particular access that has expired. In that case, the user workstation 12 might have to proceed as if it had not key at all, and request the necessary key from a key server 14. In some systems, the user workstation already has the secret key, but it is not accessible without the assistance of a key server. Some technologies that can be used to "lock" or "protect" a secret key using software at a user workstation include Arcot's cryptographic camouflage techniques, such as those described in U.S. Pat. No. 6,170,058), encryption of key with a symmetric key using a symmetric encryption algorithm such as Triple DES (3DES) or AES, such as is described in U.S. Pat. No. 2002/0126850 [U.S. patent application Ser. No. 10/093,881, filed Mar. 8, 2002 and entitled "Method and Apparatus for Cryptographic Key Storage Wherein Key Servers are Authenticated by Possession and Secure Distribution of Stored Keys"].

Typically, the key is a data sequence that is difficult to arrive at without contacting a key server. For example, the key might be a particular 1024-bit sequence that is not easily guessed or determined from all other data that might be available to a user workstation not already having access to the key.

Figure 2:
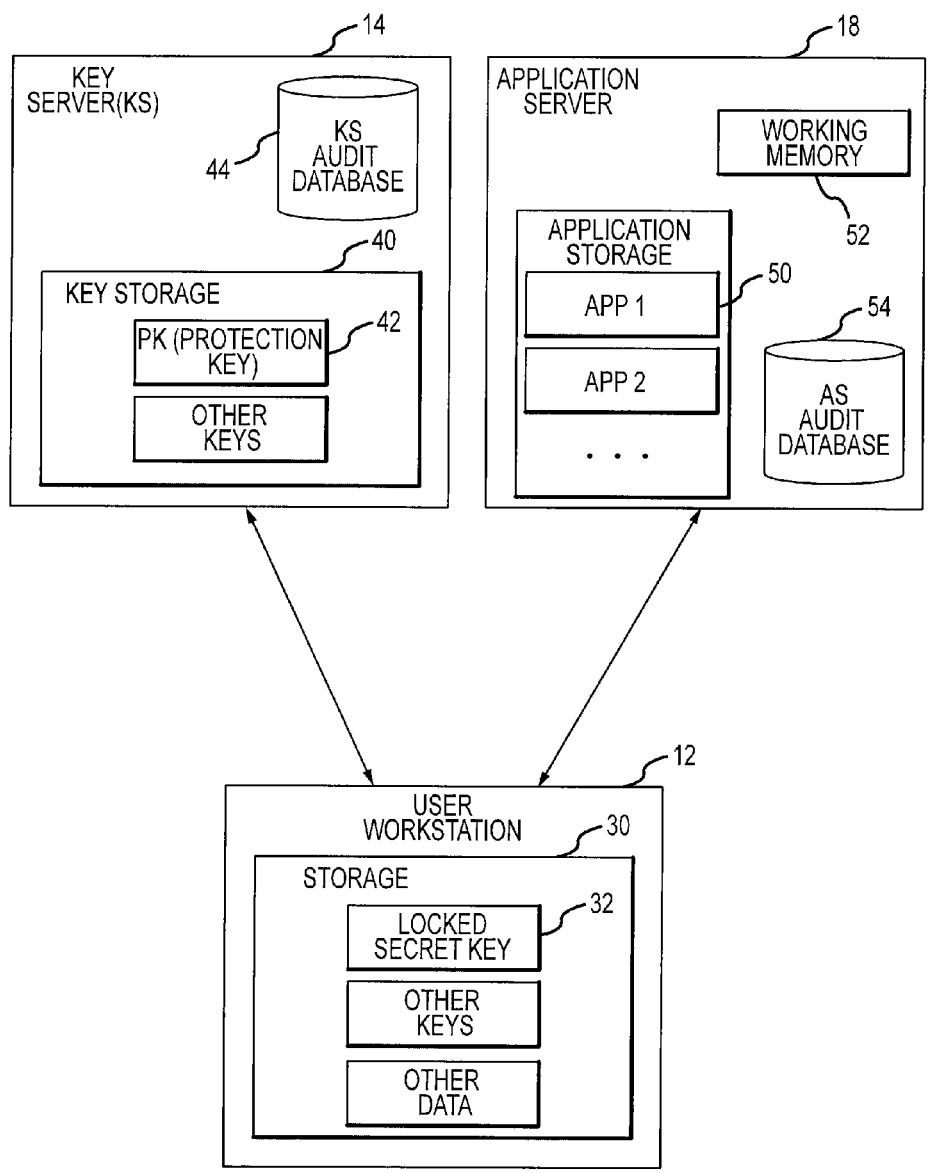
FIG. 2 is a block diagram showing instances of the user workstation, key server ("KS") and application server ("AS") of FIG. 1 in more detail.

FIG. 2 shows several elements that might be present in a user workstation 12, a key server ("KS") 14 and an application server ("AS") 18 according to embodiments of the present invention. As shown therein, user workstation 12 includes storage 30 for a locked secret key 32, as well as other keys and other non-key data. Not shown is other elements typically found in a user workstation, such as a processor, RAM, ROM, display, keyboard, mouse, network interface, hard drive, video processor, etc. Some workstations might also include card readers and smart card readers, such as a smart card that contains secrets only accessible by software not entirely controlled by the owner of the user workstation. The processor might execute programs, such as an operating system, and other programs as prompted by the user or as indicated by configuration files stored on the hard drive. One such program might be a network-enabled program to communicate with the key server and the application server. Some application examples include: Arcot's WebFort™ browser plug-in for browsers such as the Internet Explorer™ browser and Netscape's browser. The browser plug-in accesses keys for use in creating digital signatures of documents. The documents can be in a variety of formats, such as ASCII text, HTML, XML, GIF, JPEG, or PDF. Other examples might include Arcot's WebFort™ plug-in for Adobe Acrobat. This plug-in accesses keys for use in signing Adobe Acrobat PDF files within Adobe Acrobat. Yet other examples might include a virtual private network (VPN) program that accesses keys to use in cryptographic protocols such as IPSec and SSL.

KS 14 is shown including key storage 40, including a protection key ("PK") 42 and possibly other keys, and a KS audit database 44. AS 18 is shown including application storage for applications 50 served by AS 18, a working memory 52 and an AS audit database 54.

The KS audit database tracks "pre-operation" events and the AS audit database tracks "post-operation" events, which can be analyzed together. (See description of FIG. 3 below.) In a typical operation, user workstation 12 the user workstation wishes to perform a cryptographic operation and thus sends a request to KS 14 for a PK and if authenticated properly to KS 14, KS 14 replies with PK 42 and tracks the events in its KS audit database 44. Examples of cryptographic operations include digital signatures and encryptions.

User workstation 12 can then use PK 42 to unlock locked secret key 32 and use that unlocked secret key to access resources, such as applications served by AS 18. AS 18 will track the use of unlocked secret keys, in its AS audit database 54. More specifically, the user workstation performs one or more cryptographic operation using the unlocked secret key. Results of the cryptographic operation(s) can be transmitted to AS 18 and processed there. The audit trails of the KS and the AS can be merged for analysis for fraud, etc., or to provide the user with an indication of activity.

Specific examples of the above steps will now be described.

Secret Key Unlocking: The secret key is decrypted or otherwise unlocked. Initially, the secret key is encrypted in a file that is stored on the user workstation. The protection key used to protect the secret key is derived from a key that is stored on the key server. In alternative embodiments, the secret key is stored on a smart card or other device separate from the user workstation instead of in a file on the workstation.

To unlock the secret key, software on the user workstation communicates securely with the key server to obtain the protection key. The protection key is used, with or without other cryptographic keys, to decrypt, or otherwise unlock, the secret key. Thus, the secret key cannot be properly accessed without communicating with the key server to obtain the protection key.

For each unlocking of the secret key, the key server stores an audit record of the unlocking event in the KS audit database. This audit record might include information including, but not limited to, the time of the request, the identity of the user, the IP address or other location information of the user workstation, etc. Since a secret key cryptographic operation cannot be performed without unlocking the secret key, an audit event is recorded immediately prior to any secret key operation. This stored audit record provides evidence of cryptographic activity for purposes such as refuting false claims of repudiation. In addition, the lack of this expected audit record might indicate unauthorized usage or compromise of the secret key.

Cryptographic Operation on User Workstation: Once the secret key is unlocked, it can be used for cryptographic operations, such a digital signatures and encryption. Examples of digital signature operations include RSA and DSA. Examples of encryption operations include DES, Triple-DES, and AES.

Data transmission to Application Server: The output of the cryptographic operation is sent to the application server. The data can be sent through well-known transport mechanisms such as TCP/IP, HTTP, HTTPS, etc.

Application Server Processing of Data: The application server subsequently processes and stores the data that is received from the user workstation. For example, if the cryptographic operation is a digital signature, the application server might verify and store the signature. The application server might also audit events such as signature verification and store these "post-operation" audit events as audit records in AS audit database 54.

Cross Auditing of Pre- and Post-Operation Events

The use of the secret key can be audited as it is obtained (and before it is used), at the key server and it can also be audited as it is used (after it is obtained), at the application server. A third method of auditing is the cross-auditing illustrated in FIG. 3.

Figure 3:
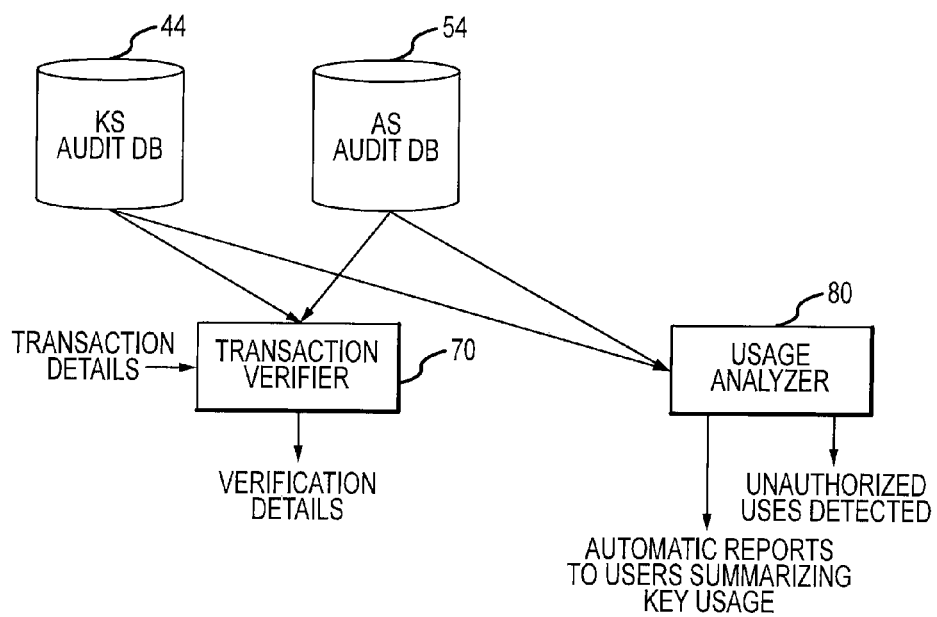
FIG. 3 is a block diagram of one or more key servers and one or more application servers, such as those shown in FIGS. 1-2.

As shown in FIG. 3, a transaction verifier 70 reads audit records from KS audit database 44 and AS audit database 54 and merges that information together, possibly also with details of transactions from a transaction processing system, and outputs verification details. Such details might be in the form of an analysis database, messages or alerts to security personnel in cases where audits turn up anomalies that need attention. A usage analyzer 80 is also included to analyze audit records from both KS audit database 44 and AS audit database 54 and indicate detected unauthorized uses and/or provide automated reports to users summarizing their usages.

The combination of pre-operation audit information with other post-operation audit information to achieve a complete trail of evidence of the user's cryptographic operation is helpful in achieving certain benefits set forth herein. The combination of pre-operation audit information and post-operation audit information can be used to detect unauthorized usage of a secret key and defend against false claims of repudiation of authorized activity.

The key server maintains an audit record of each attempt to unlock a secret key. The key server can store this audit information in a variety of formats, such as in a relational database or in a text file. Each audit record contains information such as the time, transaction ID, the IP address or location of the user, and the UserID or unique user name of user.

In one embodiment of a cryptographic system, an audit analyzer program periodically scans each audit record in the key server audit database. For each audit record in the key server audit database, the audit analyzer attempts to find a linkage to one or more other audit logs on the application server. If a linkage is not present, or a linkage does not fit an expected profile, the audit analyzer records the abnormal finding in an audit analysis report.

The system is flexible enough to accommodate a wide variety of profiles that represent the normal usage for a given application environment. For example, in one application, a normal profile could consist of the following two conditions:

1) If, for each audit record in the key server, the following information is recorded:
   a) time
   b) Transaction ID
   c) IP address
   d) Unique user name 2) If, for each audit record, one or more corresponding audit records is found in one of the application server audit logs within sixty seconds (or some other time period) of the time of the key server audit record, where the corresponding audit records have the same transaction ID, IP address and unique user name.

An alternative profile could be specified that allows only one corresponding audit record in the application server audit log. An alternative profile might also allow more or less than the sixty second maximum time difference.

In general, multiple profiles might be allowed, to define expected patterns vs. unexpected patterns under different profiles. A profile might specify attributes such as:
   a) time delays between key access and key usage;
   b) the number of times that a key can be used on a resource server in a given session; and/or
   c) whether or not the IP address or location information can be different during key access and key usage.

One technique to defend against a false claim of repudiation of authorized activity involves comparing audit records from KS audit database 44 and AS audit database 54. An authorized user could deny carrying out a legitimate cryptographic operation at a later time, but the KS audit database 44 would show that the user workstation actually requested that the secret key be unlocked. The records in the audit databases are matched up by transaction verifier 70 as well as usage analyzer 80.

The matching of records might be done by correlating the timestamp of the disputed audit event in the post-operation ("AS") audit database with all audit records in the pre-operation ("KS") audit database for the same user that have a timestamp within a specific time-interval. The time-interval might be configurable. In one embodiment, the time interval over which the KS audit database is searched ranges from a time $T_0$ before which the event is assumed not to have occurred and a time $T_E$ of the disputed post-operation audit event. The time $T_0$ might be calculated as shown in Equation 1, where S is a maximum cryptographic session period and D is a maximum expected delay.

$$T_0 = T_E - S - D \quad \text{(Equ. 1)}$$

S is the maximum cryptographic session period, which can be estimated from the maximum time period that the user workstation software allows the secret key to remain unlocked. D is the maximum expected delay for data to be sent from the user workstation software to the application server plus the maximum amount of time that is expected for the application server to write an audit log record of the post-operation event.

If a user denies carrying out a legitimate cryptographic operation at a later time, the disputed event will likely be a post-operation event that is audited in the AS audit database. The above mapping technique can be used to locate the pre-operation event that correlates to the post-operation event. If a pre-operation event is found for the user within the allowable time interval, the pre-operation event can be used as evidence against the false claim of repudiation.

The pre-operation event information might include the time, the identity of the user, and the IP address or other location information of the user at the time the key was unlocked. With this evidence, it would be more difficult for a user to refute a cryptographic operation performed with a secret key, since the unlocking of the secret key was audited and tracked to a specific user, time, and place.

In addition to nonrepudiation, the cross-auditing can be used to defend against malicious or unauthorized used of a secret key. It may be possible that a user's secret key is lost, stolen, or revealed to a malicious user, making it possible for the malicious user to perform secret key operations directly with the secret key without interacting with the key server that normally unlocks the secret key for authorized users. If that happens, the AS audit database will contain audit records of post-operation events that do not have corresponding pre-operation events in the KS audit database.

Software in the usage analyzer 80 finds each event in the AS audit database and attempts to map it to an event in the KS audit database. If an event is not located within a specific time interval, it is assumed that an unauthorized use of the secret key has occurred and appropriate defensive actions can be carried out, such as disabling a user's account or even shutting down the affected application server.

User Activity Reports

Usage analyzer 80 can periodically send reports to users to list and summarize all pre-operation events. For example, the user might receive reports with a listing of all times that their secret key was unlocked. The report can also include information such as the IP address or other location information of where the secret key was unlocked. The report can also contain summary statistics such as the total number of unlocking attempts per day, per week, and per month. The report can include alerts that indicate if the pattern of activity is unusual. For example, it can indicate if the recent activity is significantly different than the activity of an average user. It can also indicate if the pattern activity is sufficiently different from the activity of the user during previous periods of time such as the previous week, month, or year. If the user notices any suspicious or unauthorized activity, the user can take appropriate action, such as contacting their system administrator.

The system can compare audit logs in real-time. One simple embodiment uses a separate analysis program that analyzes the audit logs on some periodic interval, for example, once per day or once per week. One advantage with systems presented here is the ability to compare the audit logs in real-time and detect suspicious activity instantly. In such embodiments, the key server itself might compare its audit logs with the audit logs of the resource server in real-time, and a separate analysis program would not be needed.

The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents.

What is claimed is:

1. A key auditing system, comprising:
   a key server, that provides access to a secret key by an authorized user;
   a resource server, that provides access to resources to authorized users, wherein authorization of a user is determined, at least in part, by the user's possession of the secret key;
   a key server audit database;
   a resource server audit database; and
   a usage analyzer that analyzes the key server audit database and the resource server audit database to compare events therein;
   wherein the key server maintains a protection key usable to unlock the secret key held by a user workstation and the resource server is configured to block access to a resource unless an indication of the unlocking of the secret key at the user workstation is provided.

2. The key auditing system of claim 1, wherein the resource server is an application server.

3. The key auditing system of claim 1, wherein the resource server is a transaction server.

4. The key auditing system of claim 1, wherein the secret key is such that it is only accepted within a pre-determined time period.

5. The key auditing system of claim 1, wherein events are compared according to a profile that specifies conditions under which particular keys can be used.

6. The key auditing system of claim 5, wherein the conditions include time delay limits between when a particular key is accessed and when the particular key is used.

7. The key auditing system of claim 5, wherein the conditions include limits on a number of times that the particular key can be used on a resource server in a given session.

8. The key auditing system of claim 5, wherein the conditions include whether usage of the particular key would be allowed where access to the particular key is from a first network address or first location and usage of the particular key is from a second network address distinct from the first network address or from a second location distinct from the first location.

9. The key auditing system of claim 1, wherein the usage analyzer is configured to analyze and compare audit database records in real-time.

10. The key auditing system of claim 9, wherein the usage analyzer is configured to disable usage of a particular key in real-time response to audit database record comparisons.

11. The key auditing system of claim 1, wherein the usage analyzer is configured as part of the key server.

\* \* \* \* \*